United States Patent Office 3,447,348
Patented June 3, 1969

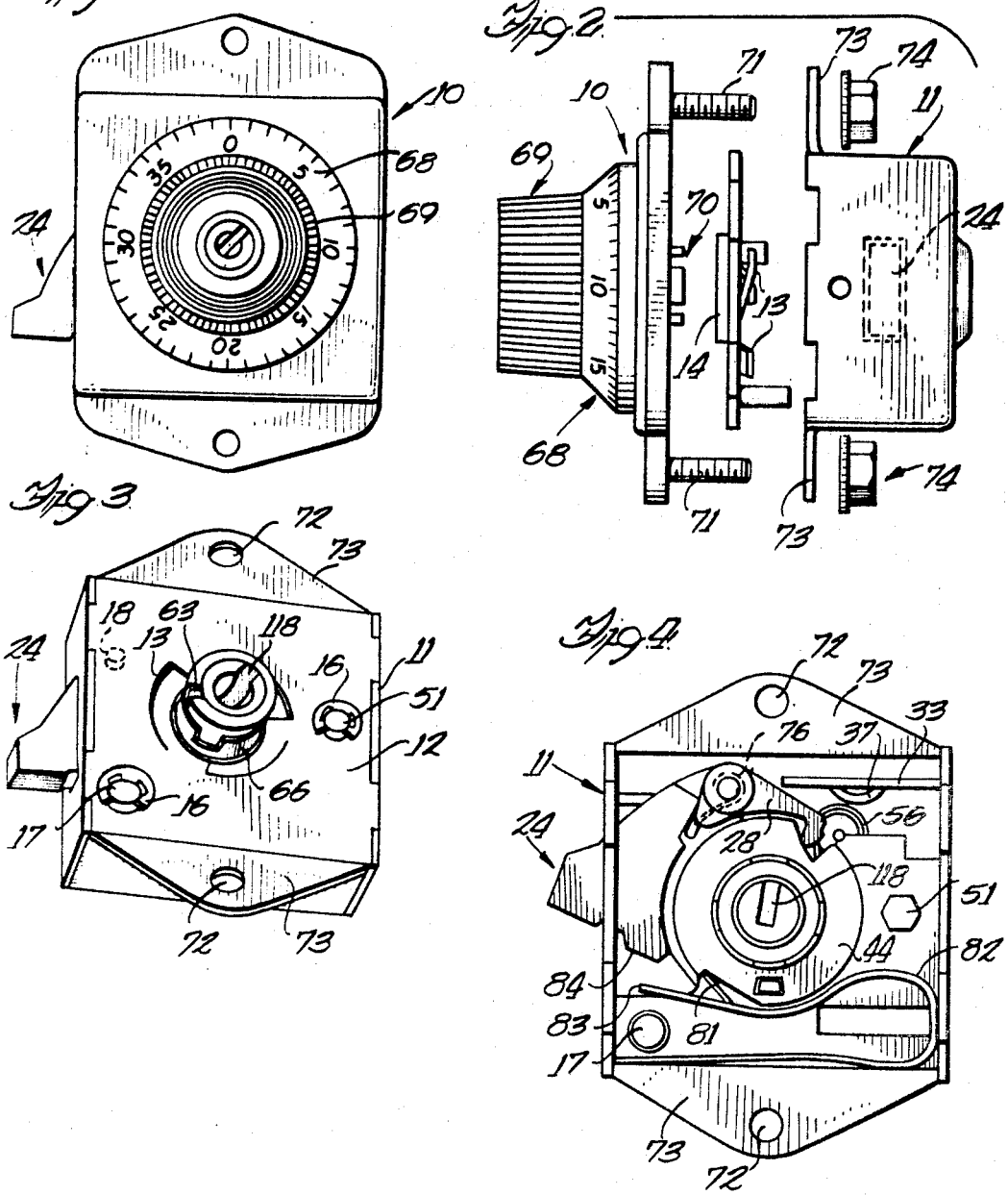

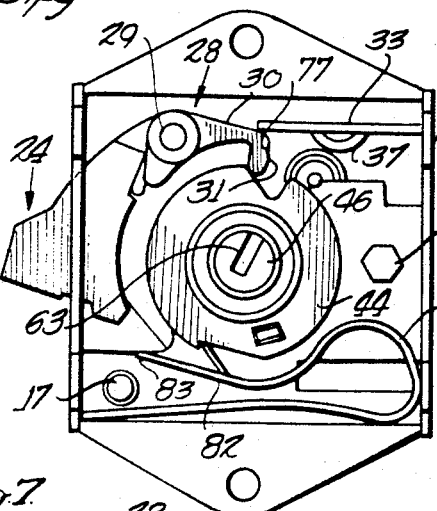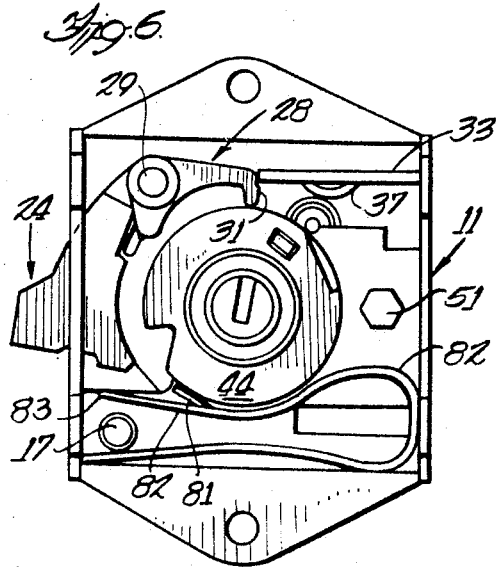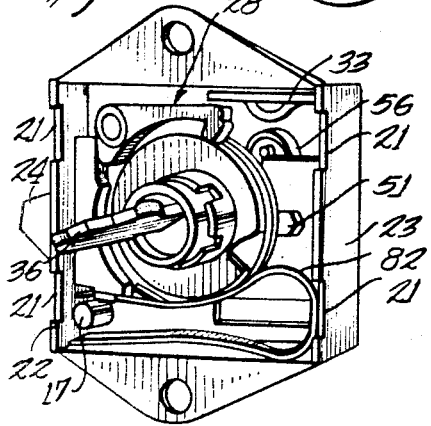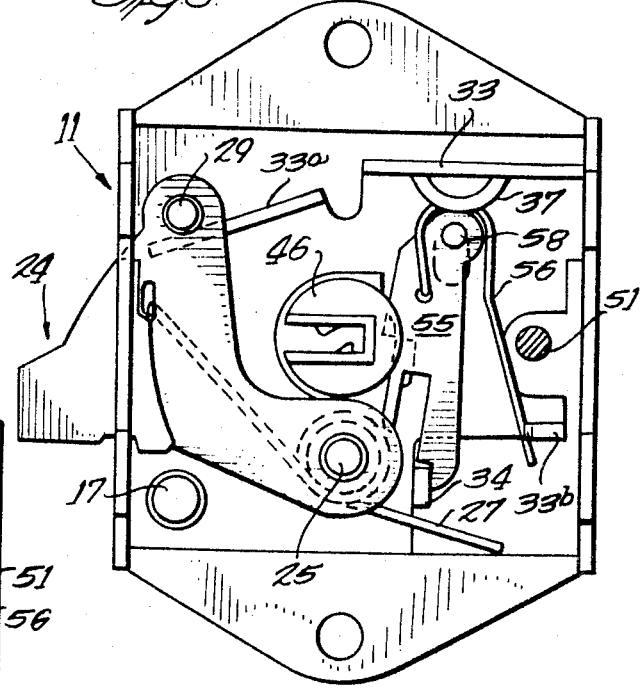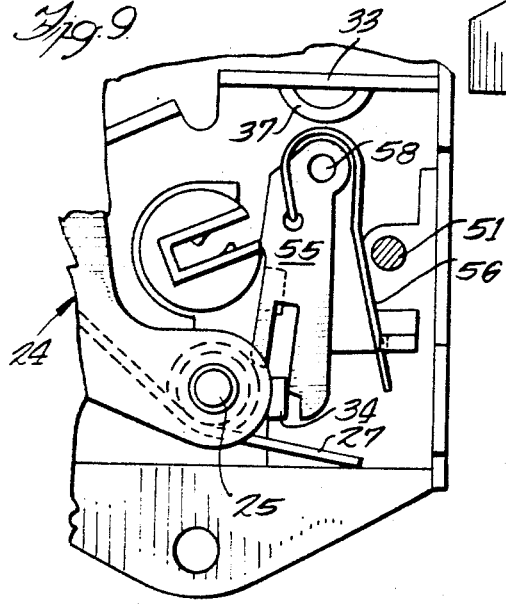

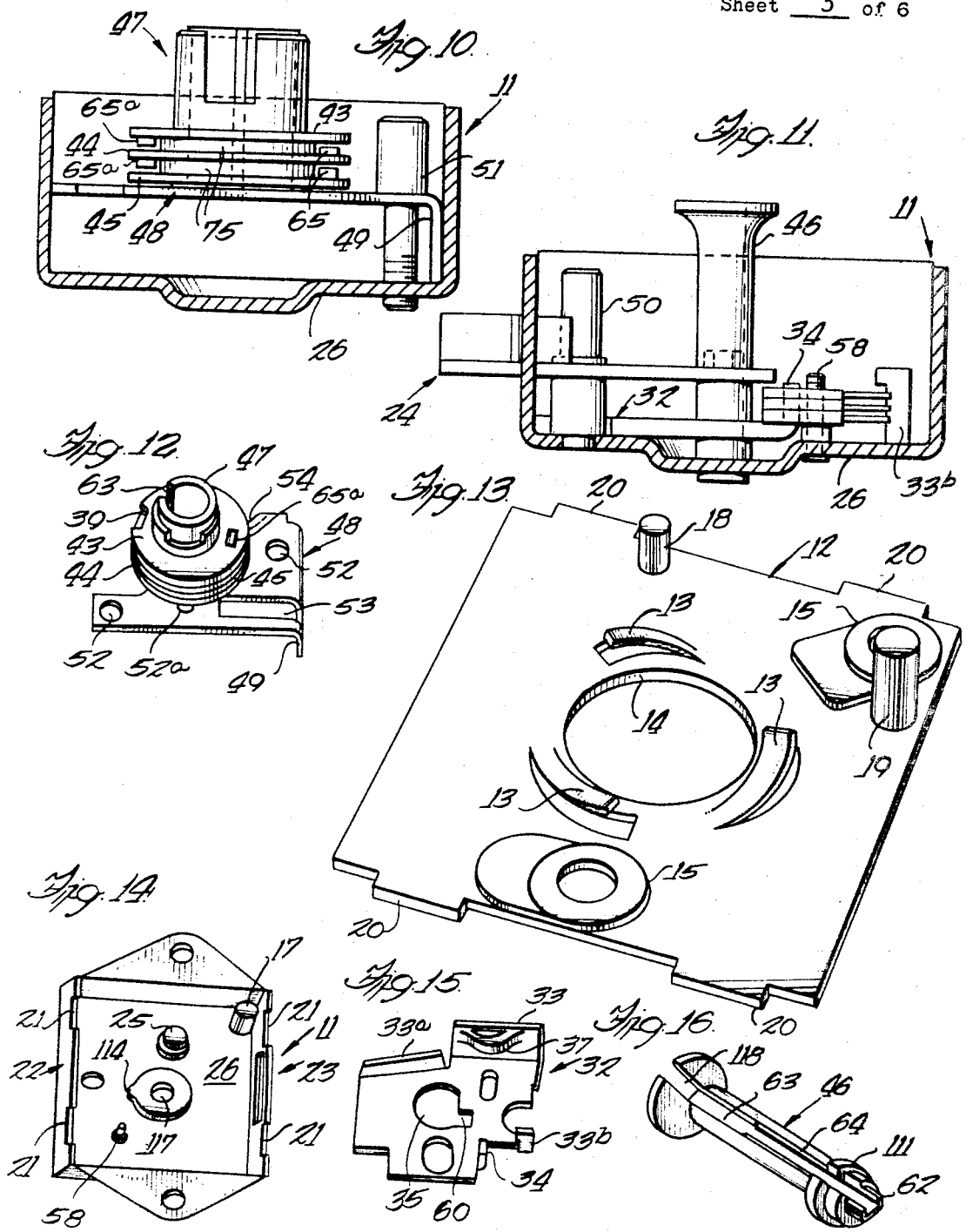

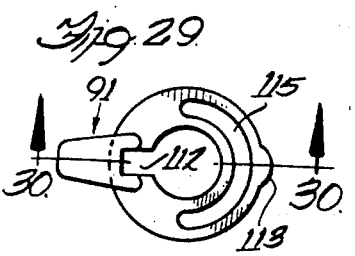
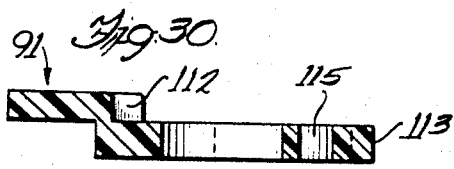
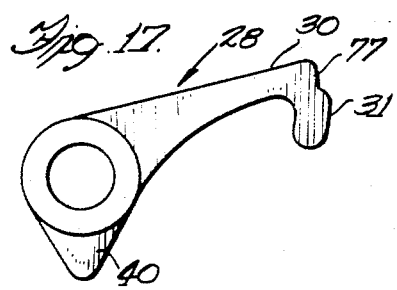
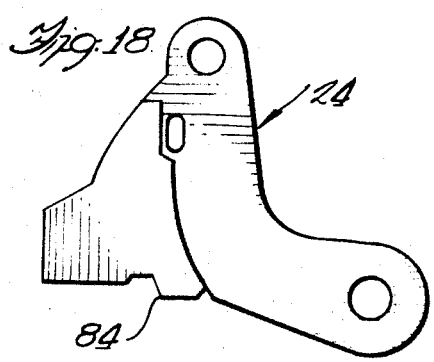
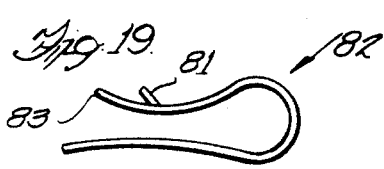
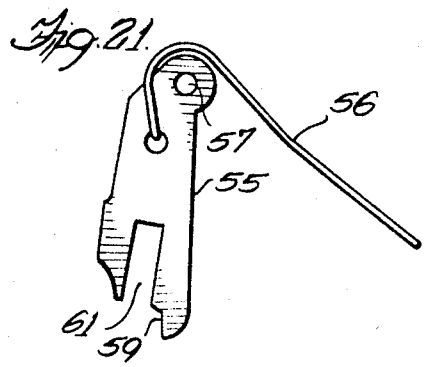
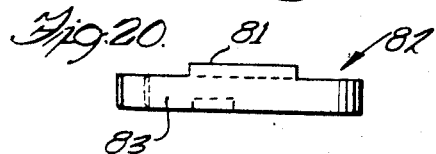
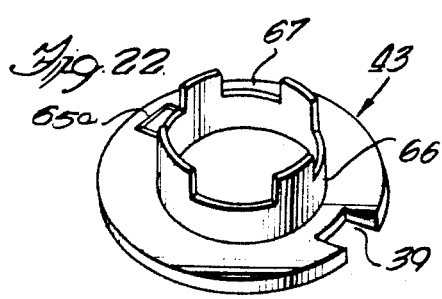
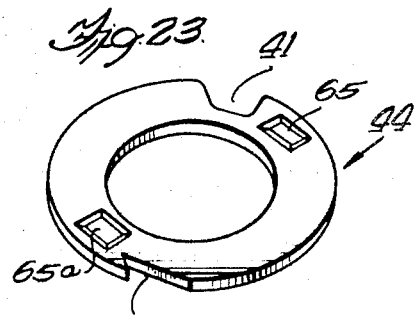
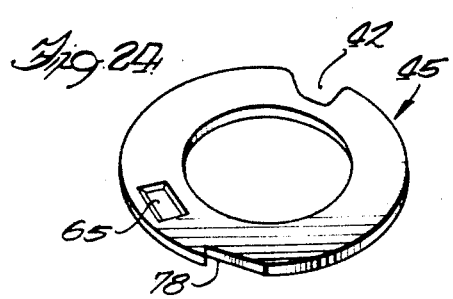

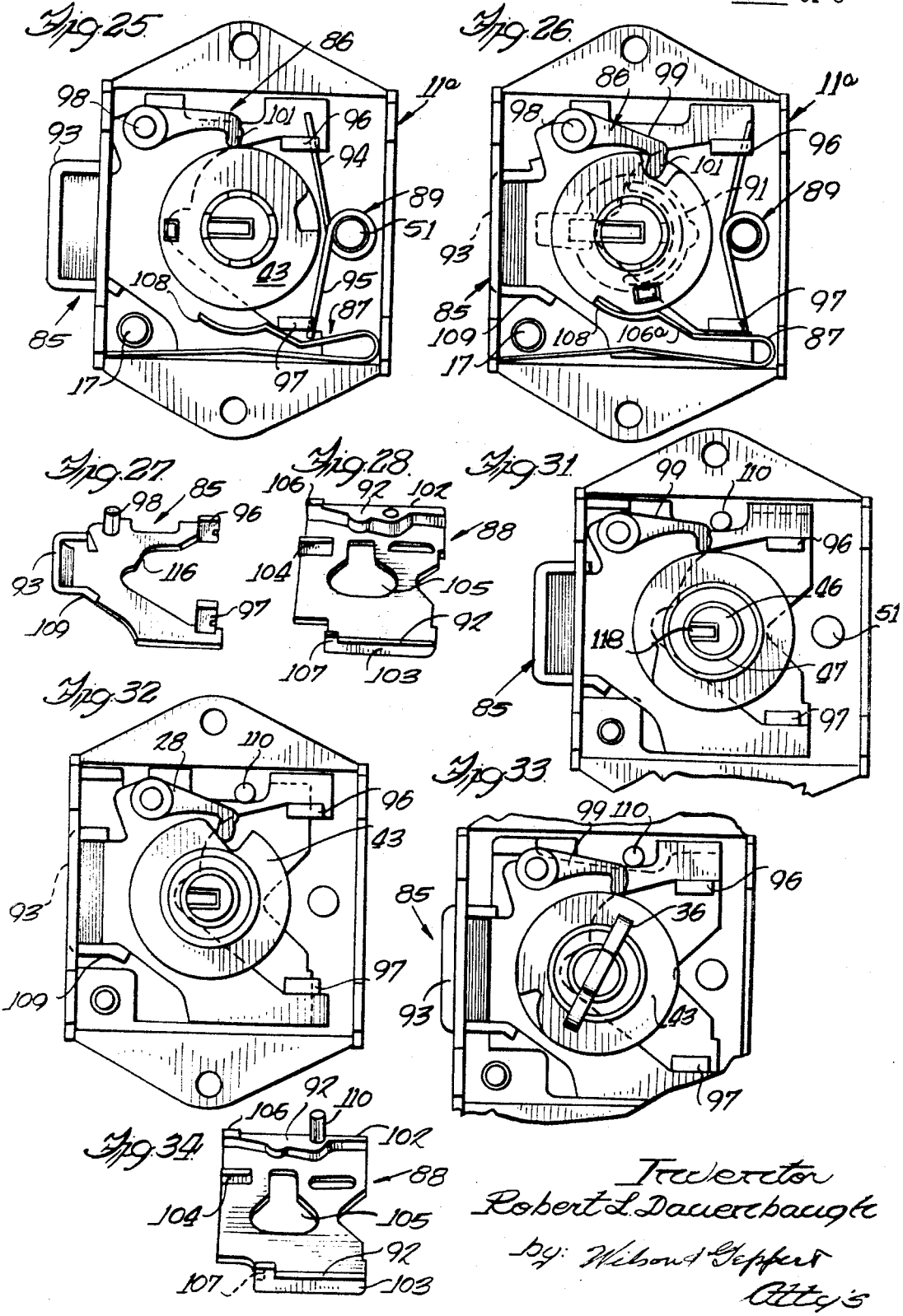

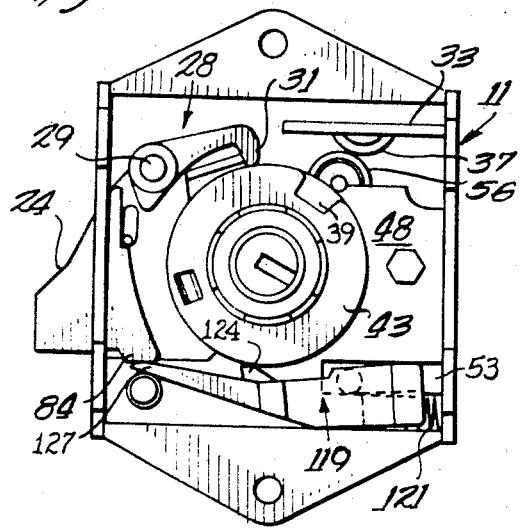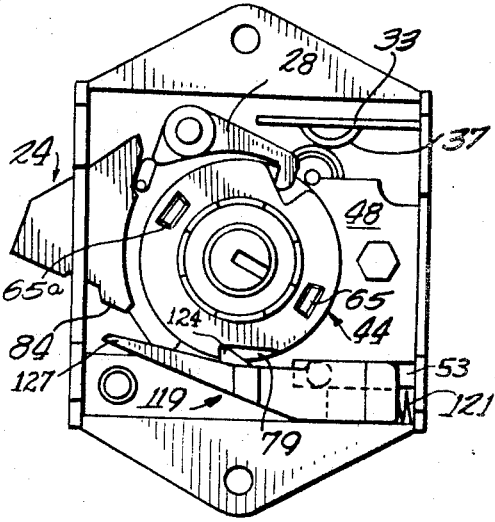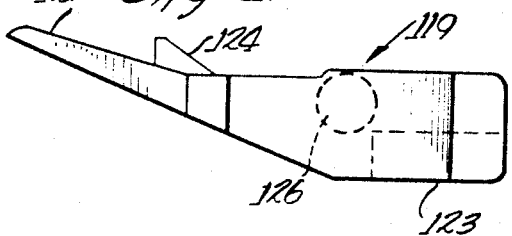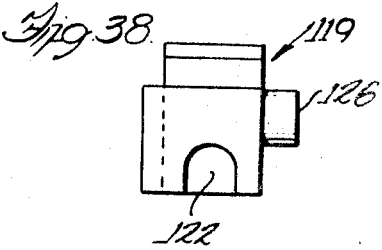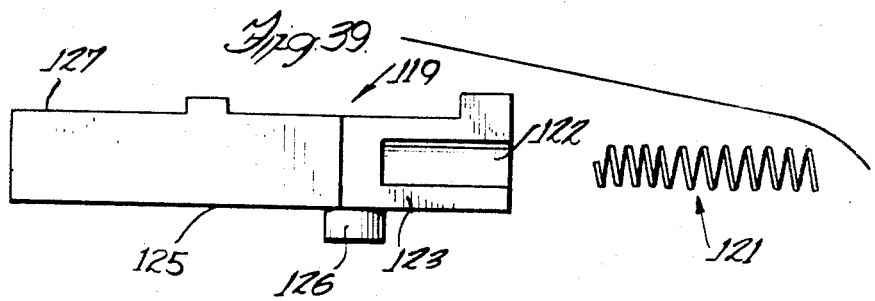

3,447,348
COMBINATION LOCKER LOCKS
Robert L. Dauenbaugh, Rockford, Ill., assignor to Keystone Consolidated Industries, Inc., a corporation of Delaware
Filed July 26, 1967, Ser. No. 656,270
Int. Cl. E05b 37/08, 65/44
U.S. Cl. 70—285                5 Claims

ABSTRACT OF THE DISCLOSURE

Combination locks operated by both permutation means and by means of a master key, including a family of locks of similar appearance for use on the doors of lockers and other enclosures each including a common self-contained unit assembly comprising a common dial, knob and escutcheon positioned at the exterior of the door, and a self-contained unit lock assembly positioned at the rear of the door and inaccessible when the door is locked, these two assemblies being joined together by threaded studs projecting from the rear of the escutcheon and extending through aligned openings in the door and casing housing the lock components, the lock components in the several embodiments of lock assemblies containing either a self-locking or a manual upset lock combination of plural common components and altered by the mere substitution of relatively few parts.

---

The present invention relates to combination locks of the type controlled by both permutation means such as a rotatable knob and calibrated dial, and also by means of a master key. Locks of this type are for use in schools and other institutions employing plural lockers or enclosures where it is usually desired that a single individual have access to but one locker and that an authorized person have access to a series or to all of the available lockers by the use of a master key.

It is also intended by the present invention to offer to prospective buyers either self-locking locks or manually locked lock and to provide for either a manual upset lock combination or automatic mechanisms which will upset the combination when the locker door is closed. Thus, it is an important object of the present invention to offer a so-called family of locks similar in appearance but differing in operation and function.

Another important object of the present invention is to provide a strong, compact, easily operable, self-locking or manually upset combination lock that may be masterkeyed and capable of being cheaply manufactured with the several embodiments combining multiple common components for economy of production.

These novel and desired features of the present invention are accomplished by means of a novel self-locking combination lock mechanism operable selectively by either permutation means or a key in combination with a door latch or locking bar permitting the locker door to be opened only once for each time the lock is operated.

A further object of the present invention is the provision of a novel family of locks either of the self-locking or manually locking types and to provide therein a manually upset lock combination or automatic mechanism adapted to upset the combination upon closing of the door.

Another object of the present invention is the provision of a family or plural locks for combination or key operation, comprising an identical permutation means including a self-contained and preassembled changing dial, knob and escutcheon assembly to be affixed to the exterior of a door or closure for a locker or other enclosure, and novel embodiments of lock mechanisms in which the novel components are mounted within a casing or housing positioned at the interior of the door or closure, the preassembled knob, dial and escutcheon assembly and the preassembled lock assembly being affixed to the door by means of self-contained threaded studs projecting through suitable mounting holes in the door and aligned mounting holes in the lock casing, both assemblies being fixedly held in operative position by suitable lock nuts and washers on the threaded studs.

In the present novel combination lock assemblies, the present invention comprehends three lock assemblies one of which embodiments comprising a combination locker lock embodying a swing bolt, a second embodying a spring bolt, and a third embodying a dead bolt, these locks containing plural common lock components for economy of production and capable of being assembled with a minimum number of added parts to produce these three novel lock embodiments.

In the drawings:

FIGURE 1 is a front elevational view of the novel automatic locker lock assembly employing a swing bolt.

FIG. 2 is a disassembled side elevational view of the combination dial, knob and escutcheon assembled as a unit, the cover plate or closure for the casing, and the casing which houses the lock components.

FIG. 3 is a perspective view of the lock casing and affixed cover plate housing therein the lock components, the dial, knob and escutcheon assembly being removed.

FIG. 4 is a front elevational view of the open lock casing showing the assembled lock components below the removed cover plate and upper permutation or locking disc and showing an initial position with the tab on the index finger or bolt pawl engaged in the notch of the permutation discs.

FIG. 5 is a view similar to FIG. 4 but showing the permutation discs rotated from the position of FIG. 4 and the upset spring cocked and ready to upset the combination.

FIG. 6 is a view similar to FIG. 5 but showing the index finger or bolt pawl lifted away from the permutation discs and abutting the locking barrier of the floating bolt to prevent the lock from being picked by lifting the handle for raising the lock bolt.

FIG. 7 is a perspective view showing a master key inserted into the assembly of FIGS. 5 and 6 for key operation, the locking barrier in the floating bolt moved upwardly permitting passage of the bolt pawl and swing bolt.

FIG. 8 is an enlarged front elevational view with the upper components including the permutation discs removed to show the lever tumblers, and the position of the fence on the floating bolt and movable barrier shown in relation to the tumblers when the components are in locked position.

FIG. 9 is a fragmentary view similar to FIG. 8 but with the master key tumblers and the floating bolt and movable barrier shown in unlocked position.

FIG. 10 is a cross sectional view through the casing showing the position of the three spaced permutation discs, spacers and the underlying supporting plate or bolt cap for combination operation.

FIG. 11 is a cross sectional view through the casing and showing the position of the three key tumblers for master key operation.

FIG. 12 is a perspective view of the bolt cap or supporting plate and the permutation discs mounted thereon.

FIG. 13 is an enlarged perspective view of the underside of the molded cover plate or closure with its integral parts including the posts, arcuate compression springs encompassing the central opening, pins and embossments.

FIG. 14 is a perspective view of the casing for housing the lock components.

FIG. 15 is a perspective view of the floating bolt or key slide.

FIG. 16 is a perspective view of the slotted key post.

FIG. 17 is a top plan view of the index finger or bolt pawl.

FIG. 18 is a top plan view of the lock bolt.

FIG. 19 is a top plan view of the upset spring.

FIG. 20 is a side elevational view of the upset spring.

FIG. 21 is a top plan view of a lever tumbler and its spring.

FIG. 22 is a perspective view of the upper permutation or locking disc.

FIG. 23 is a perspective view of the intermediate permutation disc.

FIG. 24 is a perspective view of the lower permutation disc.

FIG. 25 is a top plan view of a second embodiment of a spring bolt lock assembly having the cover plate removed and its lock components shown in locked position.

FIG. 26 is a top plan vew of the embodiment of FIG. 25 but with the upper permutation or locking disc removed to show the upset spring engaged in the upset notch in the intermediate and lower combination or permutation discs, the lock bolt being shown in retracted position effected by rotating the knob when in proper indexed position.

FIG. 27 is a perspective view of the spring bolt employed in the embodiment of FIG. 25.

FIG. 28 is a perspective view of the floating bolt or key slide of the embodiment of FIG. 25.

FIG. 29 is a top plan view of the plastic key post shifter.

FIG. 30 is an enlarged horizontal cross sectional view taken on the line 30—30 of FIG. 29.

FIG. 31 is a top plan view of a third embodiment employing a dead bolt, the cover plate of the assembly having been removed to show the lock components in locked position.

FIG. 32 is a top plan view similar to FIG. 31 with the parts indexed by combination operation of the knob and the bolt retracted.

FIG. 33 is a view similar to FIG. 31 with bolt unlocked and retracted by operation of a master key.

FIG. 34 is a perspective view of the floating bolt or key slide of the dead bolt assembly of FIGS. 31 to 33, inclusive, this floating bolt being similar to that of FIG. 30 except for the addition of an upstanding pin.

FIG. 35 is a front elevational view of the open lock casing embodying an alternate form of upset pawl to effect upsetting the combination of the lock mechanism.

FIG. 36 is another front elevational view but with the upper permutation or locking disc removed and the slot in the periphery of the intermediate and inner permutation discs engaged by the tab on the index finger or bolt pawl and the tab on the upset pawl engaged in the peripheral notch of these discs.

FIG. 37 is a front elevational view of the upset pawl.

FIG. 38 is a rear elevational view of the upset pawl.

FIG. 39 is a bottom plan view of the upset pawl and the compression spring removed from the recess in the bottom of the pawl.

Referring more particularly to the embodiment disclosed in FIGS. 1 to 24, inclusive, such relates to a novel automatic locker lock having a swing bolt, the present invention comprises a novel combination locker lock construction including a unit assembly of a combination changing dial, knob and escutcheon 10, this assembly being of the construction disclosed and claimed in the North and Dauenbaugh Patent No. 3,273,363, of Sept. 20, 1966, and readily affixed to the casing 11 housing the lock components adapted to be operated either by proper indexing and rotation of the combination dial and knob, or by means of a master key.

The lock assembly includes the recessed rectangular casing 11 in which the components of the lock mechanism are housed and enclosed by a closure or cover plate 12 (FIG. 2, 3 and 13) molded of a suitable plastic composition and circumferentially slotted about a central opening to provide three spaced arcuate compression springs 13 on its underside each anchored at one end with the other depending flexible end having contacting engagement with and applying spring pressure to the enclosed components of the assembled lock mechanism, an annular collar or dial bearing surface 14 defining a central opening, two embossments providing mounting pockets 15 on its upper or outer surface each receiving a retaining clip 16 for securing the cover plate upon the mounting pin 17 and screw or fastener 51, a depending cam pin 18, a spacer lug 19 and four projecting locating tongues or projections 20, two projecting from each of two opposite sides for retention in spaced complementary grooves or slots 21 in two opposite side walls 22 and 23 of the casing 11.

A swing lock bolt 24 is pivotally mounted upon a pin 25 (FIGS. 8 and 9) secured to and projecting inwardly from the bottom wall 26 of the casing 11, preferably below the upper portion of the lock bolt 24, the bolt being urged into locking position by a spring 27. An index finger or bolt pawl 28 is pivoted upon a pin 29 affixed to the upper portion of the lock bolt 24 at a point removed from the bolt pivot or pin 25. This index finger 28 is provided with a cam surface 30 and an inturned end 31.

For key operation, the present invention provides a floating bolt or key slide 32 disposed upon the inner surface of the rear wall 26 of the casing 11 for sliding movement between this wall and the overlying lock bolt 24. This floating bolt 32 is provided with an inclined flange 33$^a$, a post 33$^b$ and a lateral projection or flange 33 forming a movable barrier upon one end and a fence 34 projecting at a right angle to the flange 33 at the opposite end, with a centrally disposed opening 35 for insertion and operation by a master key 36. An embossment 37 is provided on the flange 33 to aid the flange in camming the index finger or pawl 28 downward as the bolt rotates when the floating bolt or key slide 32 is in locked position, retaining engaged the inturned end 31 of the index finger with radial slots 39, 41 and 42 in permutation discs 43, 44 and 45, respectively (FIGS. 22, 23 and 24).

The key slide or floating bolt 32 is so arranged as to be moved into its two positions by the master key 36 which in turn is positioned by a slotted key post 46 journalled at one end in the bottom or rear wall 26 of the casing 11 and at its other end in a cylinder 47 carried by the supporting plate or bolt cap 48 (FIGS. 10 and 12) affixed to the casing 11 in spaced relation to the rear or bottom wall 26 of the casing and overlapping the lock bolt 24. This supporting plate 48 has an inturned flange 49 to space the main or body portion of this plate from the rear wall 26 of the casing 11 and retained upon the pin 17 by a single screw or fastener 51 in the apertures 52, the supporting plate also provided with a slot 53 and an aperture 52$^a$ to receive and support the upper end of the bolt pivot or pin 25, and is also provided with an inturned end or lug at 54 positioned to contain a set of lever tumblers 55, each provided with a leaf spring 56. Three lever tumblers 55 are shown.

Each of the key or lever tumblers 55 has an aperture 57 receiving and supporting these tumblers upon a pin 58 affixed to and projecting inwardly from the rear wall 26 of the casing 11, and each tumbler is urged into locking position by its spring 56. Each tumbler 55 is notched at 59 and slotted at 61 to engage the fence 34 upon the key slide or floating bolt 32 to prevent or permit sliding movement of the latter and its integral movable barrier 33.

Thus, upon insertion and rotation of the proper key 36, the key slide 32 is moved to one or the other of its extreme positions and moving with it is the integral movable barrier 33, permitting the lock bolt 24 to be rotated independently of the permutation means or restricted from rotation except as determined by the permutation discs, as will be later described. The outer end of the cylinder 47 is spun over to retain the key post 46 (FIG. 3) and provided with a single entrance for key slot 63 whereby the key may be withdrawn only when the bolt 24 is locked. The paracentric keyway section 64 has its inner end 62 received in a hole 117 in the bottom wall 26 of the casing, and is concealed from view when installed in the lock assembly to enhance the security of the lock assembly. The visible keyway 118 appears only as a rectangular opening for a flat key which cannot be inserted far enough to reach the tumblers. As the paracentric keyway is concealed from view, one trying to gain unauthorized entry by filing a key to fit is frustrated in his efforts, thus improving lock security.

Whereby operation of the lock bolt 24 may be controlled by a combination mechanism, the series of permutation discs 43, 44 and 45 are mounted for rotation upon the cylinder 47. In the disclosed embodiment three such discs are employed including the inner end disc 45, the intermediate disc 44 and an outer or locking disc 43 with each of the discs 43 and 45 provided with a single embossment, the disc 45 having an embossment 65 and the disc 43 with an embossment 65a, and the intermediate disc 44 provided with two embossments 65 and 65a, one projecting from each side thereof. Thus, the embossment 65a on the outer disc 43 is depressed, one of the embossments 65 on the intermediary disc 44 is elevated and the other 65a depressed, and the embossment 65 on the inner or bottom disc 45 is elevated.

Each of the three permutation discs 43, 44 and 45 is provided with a peripheral slot 39, 41 and 42, respectively, in its outer circumference. These slots when aligned by proper manipulation of the permutation discs, are so arranged as to receive the inturned end 31 of the index finger 28 to permit pivotal movement of the lock bolt 24. These permutation discs 43, 44 and 45 with their embossments are adapted to pick up one another when rotated in opposite directions as required to set the combination for which the lock is assembled for proper operation, and thus are assembled in a predetermined relationship whereby their peripheral slots 39, 41 and 42 will be in proper alignment or registration and in position to receive the inturned end 31 of the index finger 28.

The outer disc 43 is provided with an integral sleeve 66 of a diameter to rotate about the cylinder 47, and the outer end of this sleeve is unevenly slotted or notched at 67 (FIGS. 7 and 22) to receive the setting dial 68 and and knob 69 of the combination changing dial and escutcheon unit assembly 10. This dial, knob and escutcheon unit is disclosed in the North and Dauenbaugh Patent No. 3,273,363, and is so constructed as to be assembled to the present lock assembly in but one aligned position due to the uneven arrangement of the notches or slots 67 and intermediate arcuate surfaces in the sleeve 66 interengaging with the complementary arcuate surfaces and notches 70 in the hub of the inwardly projecting end of the knob and dial, thereby avoiding an improper assembly of these two units.

As shown in FIG. 2 of the drawings, the combination changing dial, knob and escutcheon assembly 10 is intended to be affixed to the exterior of a locker door and the casing 11 housing the lock components is mounted at the interior of the door. This is readily accomplished by providing the dial, knob and escutcheon assembly 10 with preassembled threaded studs 71 projected through openings in the door and received in openings 72 in the anchoring flanges 73 of the casing 11 housing the lock components, and retained by suitable lock nuts and washers 74.

The inner face of the outer disc 43 is provided with the depending projection or embossment 65a and a raised projection 65 is provided on the inner end disc 45 and similar projections 65 and 65a on the opposite sides of the intermediate disc 44. These projections are located radially in different locations on each disc and it is to be understood that each disc will have a different combination orientation number. Thus it is theoretically possible to have forty different outer end discs 43, and a like number of different intermediate discs 44 and inner end discs 45, so as to provide for a large number of individually different combinations to be assembled.

The projections or embossments 65 and 65a are of sufficient height or depth to engage and coact with a projection on each of the adjacent permutation discs 43, 44 and 45, these permutation discs with their associated projections 65 being separated by intervening spacers or washers 75 which are keyed to the cylinder 47 to prevent relative rotation therebetween and to prevent one disc from rotating the adjacent disc except through abutting engagement of the projections 65 and 65a. Thus, upon rotation in one direction of the knob 69, the outer or upper permutation disc 43 connected to the knob will be rotated and engage the intermediate disc 44 which in turn will engage the inner or lower disc 45 through the coacting projections 65 and 65a. Upon reverse rotation of the knob, the inner or lower disc 45 will remain stationary and the outer disc 43 will then engage and rotate only the intermediate disc 44. Upon another reverse rotation of the knob 69, the intermediate disc 44 will remain stationary and the disc 43 only will be rotated. Consequently, by rotating the knob 69 the prescribed number of turns and direction of rotation, stopping at the proper designated place or number at each turn, the permutation discs 43, 44 and 45 may all be properly set so that the slots 39, 41 and 42 will be arranged in alignment. When these discs are all properly positioned with their peripheral slots in alignment, the pivoted lock bolt 24 may be swung in a clockwise direction about its pivot pin 25 to an unlocked position as viewed in FIGS. 4 and 5.

Rotation of the bolt 24 about its pivot carries the pivoted index finger or pawl 28 in a clockwise direction so that when the peripheral slots 39, 41 and 42 have been properly aligned, the inturned end 31 of the index finger 28 will be moved into the aligned slots of the permutation discs 43, 44 and 45 when moved away from the cam pin 18 affixed to the cover plate 12 (FIG. 13), by an index finger or pawl spring 76. Further pivotal movement of the bolt 24 merely carries the index finger 28 in a further clockwise direction and rotates the three permutation discs 43, 44 and 45 about the cylinder 47 and thereby prevents another from observing the last dialed number in the combination.

In the event the peripheral slots 39, 41 and 42 of the permutation discs 43, 44 and 45 are not in alignment, and the locker handle is lifted, the index finger or pawl 28 cannot rotate about its pivot 29 due to its end 77 engaging and being locked against the movable barrier 33 on the movable key slide or floating bolt 32, and thus preventing pivotal movement of the lock bolt 24 (FIG. 6). Thus, any attempt to pick the lock combination by lifting the locker handle to engage and swing the lock bolt to open position which would normally let the index finger or pawl 28 rest on the permutation discs 43, 44 and 45 and permit the unauthorized person "feel" the slots 39, 41 and 42 which might then be aligned for illegal entry, in the present invention the index finger 28 would be lifted away from these entry slots in the permutation discs by the engagement of the end 77 with the movable barrier 33 on the floating bolt 22.

The bolt 24 is also adapted to be unlocked by means of a master key 36 whereby when the key is inserted into the slotted key post 46 and rotated it turns the key post projecting through the central opening 35 in the floating bolt and moves this floating bolt 32 to its upper position as viewed in FIG. 7, whereby the movable barrier 33 on the floating bolt or slide 32 is moved to its upper position so as not to block and prevent movement of the index finger or pawl 28. In this position, the inturned end 31 of the index finger 28 merely slides about the peripheries of the permutation discs 43, 44 and 45 and the lock bolt 24 is free to swing about its pivot to unlocked position.

To upset the setting of the combination, means are provided for preventing the return of one or more of the permutation discs 43, 44 and 45 upon return of the bolt 24 to the locked position by means of its bolt spring 27. In the illustrative embodiment, the inner or lower permutation disc 45 and the intermediate permutation disc 44 are each provided with a peripheral notch 78 and 79, respectively, adapted to be engaged by a tab 81 on an upset spring 82 (FIG. 4). These notches 78 and 79 are so positioned as to be aligned when the inturned end 31 of the index finger or pawl 28 is engaged in the peripheral slots 39, 41 and 42 of the permutation discs 43, 44 and 45, so that when the notches 78 and 79 are engaged by the tab 81, the upset spring 82 is "cocked" (FIG. 5) by the counterclockwise movement of the bolt spring 27 urging the lock bolt 24 and the index finger 28 to return to the locked position and turning the permutation discs 43, 44 and 45 through engagement with the index finger until the latter is lifted from the slots 39, 41 and 42 by engagement of its end 40 with the depending cam pin 18 on the cover plate 12.

When the upset spring 82 is at its maximum compressed tension (FIG. 5), the lifting of the inturned end 31 of the index finger or pawl 28 from the slots 39, 41 and 42, releases this spring 82 to return to its initial position, spinning the intermediate disc 44 and the inner disc 45 backwards so that the peripheral slots 41 and 42 are out of position where they may not be engaged by the inturned end 31 of the index finger or pawl 28, whereupon the lock is locked and remains locked until the proper combination is re-dialed. In the locked position as shown in FIG. 6, it will be evident that the tab 81 of the upset spring 82 is disengaged from the periphery of the permutation discs 43, 44 and 45 by the end 83 of this spring resting upon the cam surface 84 of the pivoted lock bolt 24. This prevents "sensing" or "picking" the combination by contact between the upset spring 82 and the permutation discs 43, 44 and 45.

This one-piece upset spring 82 provides a simple "drop-in" assembly part that replaces three parts and an assembly operation formerly required to achieve an automatic combination upset in combination locks.

The knob, dial and escutcheon assembly 10 may be readily and conveniently installed in place on the exterior of a locker door with the escutcheon having self-contained threaded studs 71 projecting through suitable mounting holes in the door and through aligned mounting holes 72 in the anchoring flanges 73 of the casing 11 of the lock assembly, with the two assemblies retained by the lock nuts and washers 74. Upon installation, the lock bolt 24 is inserted into a standard form of locker latch bar permitting closing of the door wtih the lock bolt in locked position, but requiring unlocking of the lock to open.

The knob, dial and escutcheon assembly is adapted for assembly not only with the automatic swing or rocker lock bolt 24, but also with the hereinafter described modifications (a) embodying an automatic upset spring bolt lock disclosed in FIGS. 25 to 30, inclusive, and (b) embodying a manually upset dead bolt lock disclosed in FIGS. 31 to 34, inclusive. These embodiments present a family of locks employing plural common components and are so designed and constructed as to prevent malicious damage to the locking mechanism.

In the spring bolt lock assembly disclosed in FIGS. 25 to 30, most of its components are similar to those above described in connection with the swing or rocking bolt assembly of FIGS. 1 to 24, inclusive, except for substitution of a revised form of spring-loaded lock bolt 85, index finger or bolt pawl 86, upset spring 87, key slide or floating bolt 88, spring 89 for the spring bolt 85 and a key post shifter 91 (FIGS. 26, 30 and 31), added to impart increased key slide movement. These parts replace the floating bolt or key slide 32, index finger 28, upset spring 82, lock bolt 24 and bolt spring 27 of the previous embodiment of the swing bolt of FIGS. 1 to 24, inclusive.

The loose key post shifter 91 encompasses a free-spinning key post 46, thereby eliminating the use of a soldered sub-assembly of a key post and shifter which is turned by the key independently of the key post, whereby the novel key post shifter cannot be damaged by malicious turning of the key post. The key post being free-spinning makes it impossible to apply bolt retracting or opening force to the key post and thereby improving the security of the lock.

Referring to this illustrative embodiment in FIGS. 25 to 30 of a spring bolt assembly, the casing 11ᵃ for housing the components of the lock assembly is similar to the housing 11 except for omission of the pivot pin 25 for the swing lock bolt 24 of the previous embodiment. The sliding or spring-loaded lock bolt 85 (FIG. 27) is slidably supported in the lock assembly upon sliding surfaces 92 of an underlying key slide or floating bolt 88 (FIG. 28), the lock bolt 85 having a locking projection 93. This lock bolt 85 is urged into locked position by the spring 89 (FIGS. 25 and 26) mounted upon the screw or pin 51 with the ends 94 and 95 of the spring engaged and retained in notches in the integral outwardly turned tabs or ears 96 and 97 on the lock bolt 85.

The index finger or bolt pawl 86 is pivoted on a pin 98 attached to the upper part of the lock bolt 85 and provided with a cam surface 99 and an inwardly turned end 101.

For key actuation, the floating bolt or key slide 88 (FIG. 28) is positioned on the interior of the bottom wall 26 of the casing 11ᵃ for sliding movement thereon between this wall and the lock bolt 85. This key slide is of cast metal or material with projecting surfaces 102 and 103 along its upper and lower edges, a projecting fence 104, a centrally located opening 105 for the key post 46 and key post shifter 91 provided in the back of the key slide 88. Two tabs 106 and 107 are provided at the ends of the sliding surface 92 of the key slide 88 to engage the spring lock bolt 85 for its retraction to its unlocked position by rotation of the master key 36 and key post 46.

The key slide or floating bolt 88 is so constructed and arranged as to be moved to two positions by the master key 36 positioned by the slotted key post 46, with the key post shifter 91 rotating in the central opening 105 of the key slide 88 and moving this key slide upon turning of the key. This key post 46 is journalled at its rear end in the rear or bottom wall 26 of the casing 11ᵃ and at its other end in the cylinder 47 carried by the supporting plate or bolt cap 48 secured to the casing 11ᵃ in spaced relation with the rear wall 26 and overlaying the lock bolt 85, and affixed to the casing in the same manner as in the previous embodiment, with the set of key tumblers 55 positioned upon the pin 58 mounted in the rear wall 26 of the casing 11ᵃ, the tumblers 55 being urged into locking position by their springs 56.

These tumblers 55 are each notched and slotted at 59 and 61 to engage the fence 104 upon the key slide 88 to prevent or permit sliding movement of the key slide and its tabs 106 and 107. Thus, upon insertion and turning of a proper master key 36 in the key post 46, the key slide 88 is moved to one or the other of its extreme positions with its integral tabs 106 and 107 engaging the spring lock bolt 85 and moving the latter to its unlocked position independently of the permutation means or discs 43, 44 and 45. The end of the cylinder 47 is spun over to retain the key post 46 having a key entrance slot 63 whereby the key may be withdrawn only when the bolt 85 is locked.

A series of permutation discs which in each of the present embodiments comprises three discs 43, 44 and 45, provide means for controlling operation of the lock bolt 85 by a combination mechanism in the manner previously explained. However, the combination upset mechanism obtained by means of these permutation discs in the present embodiment of the spring bolt lock (FIGS. 25–30) varies from the previously described upset as follows:

Upon dialing of the combination, the slots 39, 41 and 42 in the permutation discs 43, 44 and 45, respectively, become aligned and arranged to receive the inwardly turned end 101 of the index finger or bolt pawl 86. The outer disc 43 with its integral sleeve 66 rotates about the cylinder 47 and with the end of this sleeve unevenly slotted at 67 to receive the complementary notched projection 70 on the setting dial 68 and knob 69 of the combination changing dial assembly 10. With the knob and dial on the outer surface of the door or closure of the locked compartment or locker keyed to the sleeve 66 inside the locked compartment and with the inwardly turned end 101 of the spring-loaded index finger or bolt pawl 86 engaged in the slot 39 in the outer or locking disc 43, the bolt 85 and the pivot pin 98 upon which the index finger 86 is mounted, may then be retracted to the unlocked position by rotating the knob 69. In the event the permutation slots 39, 41 and 42 of the discs 43, 44 and 45 are not aligned, the index finger 86 cannot rotate about its pivot pin 98 although urged against these permutation discs to engage the slot 39 of the disc 43 thereby making it impossible to retract the lock bolt 85 by means of the knob 69 to unlock the lock.

To upset or destroy the setting of the combination, means are provided to prevent the return of one or more of the permutation discs 43, 44 and 45 upon return of the bolt 85 to locked position by means of the spring 89. In the illustrative embodiment, the inner disc 45 and the intermediate disc 44 are provided with the peripheral notches 78 and 79 so arranged as to be engaged by the end 108 of the upset spring 87. Upon dialing of the proper combination to align the slots 39, 41 and 42 of the permutation discs 43, 44 and 45, respectively, and thereby permitting the inturned end 101 of the index finger 86 to be engaged and particularly in the slot 39 of the upper disc 43, the lock bolt 85 is capable of being retracted by manual turning of the knob 69 which is directly keyed to the permutation disc 43.

When the knob 69 is turned, the initial inward movement or retraction of the lock bolt 85 and attached lower tab 97 releases the upset spring 87 and its disengaging ramp 106ᵃ (FIG. 26) from contact with the lower tab 97 of the bolt 85, thus permitting this upset spring to be urged by its own spring tension against the intermediate and lower discs 44 and 45 and into their notches 79 and 78. Continued rotation of the knob 69 effects a change from the locked position of FIG. 25 to the unlocked position of FIG. 26.

In the unlocked position, the end 108 of the upset spring 87 is engaged in notches 78 and 79 of the discs 45 and 44. The outer disc 43 not having a peripheral upset notch, is spun around by the index finger 86 and the lock bolt spring 89 to thereby conceal the last number of the combination, although the inner disc 45 and the intermediate disc 44 are held in position by the upset spring 87 whereby the initial outward thrust of the lock bolt spring 89 causes the inturned end 101 of the index finger 86 to climb out of the slots 42 and 41 of the permutation discs 45 and 44, with the final outward thrust of the bolt spring 89 urging the lower tab 97 on the spring bolt 85 against the ramp 106ᵃ on the upset spring 87 which disengages the end 108 of this upset spring from the peripheral notches 78 and 79 of the discs 45 and 44, and thereby resetting the lock in its locked position with the slots 39, 41 and 42 out of alignment with the inturned end 101 of the index finger or pawl 86.

The lock assembly unit in the casing 11ᵃ and the dial, knob and escutcheon unit are mounted in operative position in the same manner as above described, the spring-loaded lock bolt 85 projecting behind or inside a conventional return flange on the locker or enclosure, or behind the inside of a conventional fixed strike, or into a movable latching bar on the locker or enclosure to effect a lock-out. In this embodiment, the bolt 85 being spring-loaded and provided with a cam surface at 109, the door can be closed and with all the components required to unlock or open the lock being in the locked position although requiring unlocking of the lock either by the permutation means or alternately by means of a master key to open the locked enclosure.

A third embodiment of this novel lock construction comprises a dead bolt lock assembly similar to the spring bolt lock assembly but eliminating from the latter the spring bolt spring 89 and its upset spring 87, and merely adding a dead bolt pin 110 to the floating bolt or key slide 88. This additional pin and eliminating the springs 87 and 89, provides a novel lock which may be unlocked and opened, or locked, by permutation means or by a master key, and capable of being keyed in common with the embodiment of the swing bolt lock and the embodiment of the spring bolt lock previously described, with a manual upset of the permutation means and a dead bolt lock operation.

In this novel embodiment disclosed in FIGS. 31 to 34, inclusive, this dead bolt assembly employs a lock bolt 85 similar to that of the spring bolt assembly, although its common extended locking projection 93 on the bolt is adapted to be pushed into the casing 11ᵃ in the spring bolt assembly of FIGS. 25 to 30, inclusive, even though the locking mechanism is in locked position; whereas, in this dead bolt embodiment the lock bolt 85 cannot be pushed or forced into the casing when the mechanism is in locked position.

In this dead bolt assembly, the permutation operation of aligning the slots 39, 41 and 42 of the permutation discs 43, 44 and 45, respectively, is identical to that previously described, except that after the proper combination has been dialed and the slots 39, 41 and 42 aligned, the inturned end 101 of the index finger or pawl 86 is thrust or forced into these aligned slots by the bolt pawl spring 76, the end of the index finger 86 which had been in contact or in close proximity to the dead bolt pin 110 (FIG. 31), is below and out of the path of this pin (FIG. 32) so that the lock bolt 85 may be manually retracted by turning the knob 69 to the retracted or unlocked position and the bolt remains unlocked until the knob 69 is rotated to thrust the lock bolt 85 out of its unlocked position.

By continued rotation of the knob 69 in the direction and beyond the point required to lock, results in an upset of the combination of this dead bolt lock. Thus, when the knob 69 and the disc 43 keyed thereto are rotated in the direction opposite that required to retract the bolt 85 to unlocked position, the opposite side of the slot 393 in the disc 43 engages the inturned end 101 of the index finger or pawl 86 carried on the pin 98 on the lock bolt 85 and forces the locking projection 93 of the bolt out of the casing 11ᵃ. In this embodiment as in the embodiment of the spring bolt, the lock bolt 85 bears upon and is slidably movable on the floating bolt or key slide 88. After the lock bolt 85 is fully projected outwardly and its movement is stopped by the projections or tabs 106 and 107 on the key slide, continued turning of the knob 69 causes the inturned end 101 of the index finger 86 to be cammed out the slot 39 of the disc 43 until it comes to rest on the outer circumference of the permutation discs.

To prevent the turning of the disc 43 back to align the slot 39 of the disc 43 with the slots 41 and 42 in the undisturbed intermediate and lower discs 44 and 45, the knob 69 must be spun at least one revolution to insure that the embossments 65 and 65ᵃ on the discs 44 and 45 are engaged to disarrange the slots 39, 41 and 42 to prevent reentry. This lock assembly may be employed as a dead-latch by turning the knob only far enough to move the locking projection 93 of the lock bolt 85 out of the casing 11ª, and by not overturning the knob 69 and dial 68 to upset the combination, re-entry may be made by simply turning the knob in the unlocking direction.

Operation of this dead lock by means of a master key is similar to the master key operation of the swing bolt assembly, for when the key slide 88 is moved to the unlocked position by the master key 36, the dead bolt pin 110 is moved away from the index finger 86 to permit the latter to move freely over the permutation discs 43, 44 and 45 to its extreme inward or unlocked position. Counter-revolution of the master key engages the cam surface 116 of the lock bolt 85 to begin initial movement of the lock bolt toward its locked position. As the master key passes the vertical position, the key post shifter 91 of the key post 46 having more reach or span than the master key, begins to take over movement of the lock bolt 85 through engagement with the central opening 105 of the key slide or floating bolt 88 to which the dead bolt pin 110 is attached. Final movement of the lock bolt 85 to its locked position is effected by the dead bolt pin 110 engaging and pushing on the end of the index finger 86.

This timing of the master key 36 to the lock bolt 85, key post shifter 91, key slide 88 and the dead bolt pin 110 effectively prevents jamming of the lock by passing the dead bolt pin over the end 101 of the index finger 86 and engaging the cam surface 99 on the latter, and thus the dead bolt pin 110 is capable of being moved to either of its extreme positions and either permit or restrict movement of the index finger 86 and its connected lock bolt 85.

To prevent a laterally projecting key post shifter secured to a key post, such as a common key-lock subassembly, from being disengaged from its key post by one with malicious intent inserting a tool or small screwdriver into the exposed key slot 118 and keyway 64 and rotating the key post 46 and otherwise normally attached key shifter, in the two embodiments of FIGS. 25 to 34, inclusive, the present invention comprehends a separate key post shifter 91. In employing the proper key the lever tumblers 55 would be so aligned as to permit movement of the key slide 88 and the bolt 85 to unlocked position.

However, one not having the combination or proper key may by the insertion and engagement of a tool or small screwdriver attempt to gain access, but such would not properly align the lever tumblers and the bolt action is blocked, whereby excessive pressure may cause disengagement of the normally affixed key shifter from the key post, and although this disruption does not affect the security of the lock which remains locked, it does render key operation to become inoperative.

In the present invention, the key post shifter 91 (FIGS. 29 and 30) comprises a separate molded part having a body portion of substantially cylindrical contour encompassing the key post 46 adjacent the collar 111 (FIG. 16), the key post shifter being below and held in place by the key slide or floating bolt 88. The keyway 64 in the key post 46 is in line with a key opening or slot 112 in the key post shifter 91, the latter having a boss 113 received in a conforming indentation or pocket in the depressed portion 114 in the base or bottom of the casing 11ª and thereby retain the key post shifter in proper alignment with the key word opening or slot 63 in the cylinder 47 when the master key 36 is removed from the slot.

The key post shifter 91 being made of a suitable plastic composition having inherent resiliency and being arcuately slotted at 115 to provide an integral spring action, the boss 113 of the key post shifter may be forced out of the pocket by inserting the properly bitted master key with the inner end of this key inserted into the key slot 112, but returning the key post shifter 91 to its aligned position with the boss 113 in the pocket in the bottom of the casing 11ª.

The key post 46 and key post shifter 91 are employed in each of the spring bolt and dead bolt embodiments. Further safeguards against this separate key post shifter being maliciously displaced from the spring-loaded engagement of the boss 113 and the pocket in the casing and blocking the master key entry to unlock the lock, include the provision of the cylinder 47 and its spun-over outer end permitting only the entrance of an extremely small blade into the lock, and by concealing the keyway in the manner disclosed.

In the embodiment disclosed in FIGS. 35 to 39, inclusive, the lock components are similar to those disclosed in FIGS. 4, 5 and 6 except for the substitution for the formed flat spring 82 of a molded plastic part providing an upset pawl 119, and a simple coil or compression spring 121 mounted in an elongated recess 122 in the bottom or lower surface 123 of the upset pawl for upsetting the combination. This pawl is provided with a tab 124 on its upper surface adapted to be received in the peripheral notches 78 and 79 of the permutation discs 45 and 46, respectively. On the rear surface 125 of the upset pawl is a boss or cylindrical projection 126 slidably received in the slot 53 in the supporting plate or bolt cap 48 and providing the bearing pivot for the upset pawl and a stop limiting the forward travel of this upset pawl when reaching the forward end of travel in the slot.

As the compression spring 121 pocketed in the recess 122 pushes below the center line of the boss 126, it urges the tab 124 on the upper surface of the upset pawl 119 into the peripheral notches 79 and 78 of the discs 44 and 45 underlying the upper permutation or locking disc 43.

When the lock is in locked position as shown in FIG. 35, the projecting end 127 of the upset pawl 119 is engaged and depressed by the camming surface or end 84 of the pivotally mounted lock bolt 24 with the tab 124 out of the peripheral notches 79 and 78 of the intermediate and inner permutation discs 44 and 45.

When the notches 78 and 79 are aligned and engaged by the tab 124 on the upset pawl 119, the upset pawl is "cocked" (FIG. 36) by the counterclockwise movement of the bolt spring 27 urging the lock bolt 24 and the index finger or bolt pawl 28 to return to the locked position and turning the permutation discs 43, 44 and 45 through engagement with the index finger.

The lifting of the inturned end 31 of the index finger 28 from the slots 39, 41 and 42, releases the upset pawl 119 and spins the discs 44 and 45 backward so that their peripheral slots are out of position where they may not be engaged by the inturned end 31 of the index finger 28, whereupon the lock is locked and remains locked until the proper combination is re-dialed. In this locked position, the tab 124 of the upset pawl 119 is disengaged from the permutation discs.

This novel form of upset pawl 119 being a die molded plastic part, provides for cost reduction and more dimensional stability than effected by the provision of a flat spring.

The present invention provides a family or series of locks that may all be opened by a supervisor through use of a master key for actuating a lever-tumbler arrangement, or by individual manipulation of a combination dial on each lock of the series with each combination lock set to a different combination whereby thousands of combinations are available for use. These locks are so constructed that they may be readily opened for servicing.

Having thus disclosed the invention, I claim:

1. In a combination lock assembly including permutation means, comprising a casing for housing the lock components, a closure plate of plastic composition having depending arcuate leaf springs applying yielding contact with the adjacent enclosed lock components in the casing and a depending cam member, at least three permutation discs below said cover plate manipulatable to a predetermined relationship and each provided in its periphery with an indexing slot, a key slide, a spring-biased index finger having an end received in the aligned indexing slots and a shoulder adapted to abut the end of a flange on the key slide, means for actuating said discs, a lock bolt movable into locked position and releasable therefrom when the predetermined relationship is established by rotating said means, and a resiliently biased upset member consisting of a unitary generally U-shaped upset spring for automatically upsetting the combination and having a free cam end and an integral tab spaced from the cam end and adapted to engage a notch in at least one permutation disc, said lock bolt including a cam surface engaging the free cam end of said upset spring when the lock bolt is moved to locked position, said discs being movable by said actuating means upon release of said bolt, said upset spring causing counter-rotation of at least one disc upon movement of said lock bolt from unlocked to locked position and upsetting said combination after it has been manipulated to open position.

2. In a combination lock as set forth in claim 1, in which said index finger is pivotally mounted and spring-biased on said lock bolt, said discs when manipulated to the predetermined relationship having their indexing slots aligned to receive the index finger, whereby rotation of said lock bolt and index finger in one direction causes movement of said discs from locked to unlocked position and allows the upset spring tab to engage the notch in the disc, and rotation of said lock bolt in the opposite direction returns the notched discs toward locked position and causes compression of said upset spring until the index finger is cammed out of said indexing slots, at which time said spring is released to spin said disc to upset the combination.

3. In a combination lock as set forth in claim 1, including a key slide, a cylinder carrying said permutation discs and enclosing a rotatable key post adapted to move said key slide upon actuation by a key without manipulation of said discs, said key post including a concealed paracentric slot preventing unauthorized entry through use of a flat key which will not function in the lock.

4. In a combination lock as set forth in claim 2, in which said index finger has a projection engaging the cam member on the closure plate for camming the index finger from the peripheral slots.

5. In a combination lock as set forth in claim 1, in which said cam surface comprises a depending projection on the lock bolt against which the free end of the upset spring abuts when the lock bolt is in locked position.

References Cited

UNITED STATES PATENTS

| | | | |
|---|---|---|---|
| 2,023,742 | 12/1935 | North | 70—285 |
| 2,292,784 | 8/1942 | Hamilton | 70—314 |
| 3,190,089 | 6/1965 | Foote et al. | 70—156 |

MARVIN A. CHAMPION, *Primary Examiner.*

R. L. WOLFE, *Assistant Examiner.*

U.S. Cl. X.R.

70—303, 314